(12) United States Patent
Song et al.

(10) Patent No.: US 8,174,795 B2
(45) Date of Patent: May 8, 2012

(54) HEAD SLIDER, HARD DISK DRIVE HAVING THE SAME, AND METHOD OF CONTROLLING THE HEIGHT OF THE HEAD SLIDER

(75) Inventors: Myung-wook Song, Suwon-si (KR); Yong-bae Yoon, Gunpo-si (KR)

(73) Assignee: Seagate Technology International, Grand Cayman (KY)

( * ) Notice: Subject to any disclaimer, the term of this patent is extended or adjusted under 35 U.S.C. 154(b) by 1142 days.

(21) Appl. No.: 12/018,303

(22) Filed: Jan. 23, 2008

(65) Prior Publication Data
US 2008/0174916 A1    Jul. 24, 2008

(30) Foreign Application Priority Data
Jan. 24, 2007   (KR) .................. 10-2007-0007656

(51) Int. Cl.
*G11B 5/60* (2006.01)
(52) U.S. Cl. .................................... 360/235.5
(58) Field of Classification Search .............. 360/128, 360/234.3, 235.3, 235.5, 294.7, 234.4
See application file for complete search history.

(56) References Cited

U.S. PATENT DOCUMENTS

| | | | | |
|---|---|---|---|---|
| 5,991,113 A * | 11/1999 | Meyer et al. | ..................... | 360/75 |
| 6,775,103 B2 * | 8/2004 | Kang et al. | ................. | 360/236.5 |
| 7,068,468 B2 * | 6/2006 | Kamijima | ..................... | 360/128 |
| 7,230,799 B2 * | 6/2007 | Lille | .......................... | 360/294.3 |
| 7,388,726 B1 * | 6/2008 | McKenzie et al. | .............. | 360/75 |
| 7,616,397 B2 * | 11/2009 | Hayakawa et al. | ............. | 360/75 |
| 7,619,857 B2 * | 11/2009 | Kurita et al. | ............... | 360/235.3 |
| 7,623,322 B2 * | 11/2009 | Umehara et al. | ............. | 360/317 |
| 7,701,676 B2 * | 4/2010 | Kubotera et al. | .......... | 360/294.7 |
| 7,729,086 B1 * | 6/2010 | Song et al. | ............... | 360/125.31 |
| 7,729,088 B2 * | 6/2010 | Kurita et al. | ............... | 360/234.4 |
| 7,755,867 B2 * | 7/2010 | Mei et al. | .................. | 360/294.7 |

* cited by examiner

*Primary Examiner* — Angel A. Castro
(74) *Attorney, Agent, or Firm* — Volentine & Whitt, PLLC

(57) ABSTRACT

A hard disk drive has a disk, a spindle motor for rotating the disk, a head stack assembly including a swing arm and a head slider disposed at a leading end of the swing arm, and a controller operatively connected to the head slider. The head slider is positioned by the swing arm over the disk and floats in such position during a read/write operation in which data is being read from or written onto the disk. The head slider has a head slider body, a magnetic head embedded in the body, and at least one resistive heating element that generates heat when current is supplied thereto. The heat causes the body of the head slider to thermally expand in such a way that the profile of the disk-facing side of the body of the head slider changes. The controller controls the height of the head slider relative to the disk by controlling the supplying of current to the resistive heating element(s). First, the controller measures the distance between the head slider and the disk during a read/write operation, and compares the measured distance with a predetermined optimum distance or allowable range of distances. Current is supplied and/or cut off from the resistive heating element(s) when the measured distance is different from the predetermined optimum distance or is outside the predetermined range of distances.

18 Claims, 5 Drawing Sheets

HEAD SLIDER, HARD DISK DRIVE HAVING THE SAME, AND METHOD OF CONTROLLING THE HEIGHT OF THE HEAD SLIDER

BACKGROUND OF THE INVENTION

1. Field of the Invention

The present invention relates to a hard disk drive. More particularly, the present invention relates to a head slider which includes the read/write head of the hard disk drive, and to a method of controlling the height at which the head slider floats over a data storage disk during a read/write operation.

2. Description of the Related Art

A hard disk drive (HDD) is used to store and retrieve data in computers, MPEG layer 3 (MP3) players, mobile phones, etc. To this end, a hard disk drive employs a disk, and a magnetic (read/write) head to read data recorded on the disk (so that the data can be played back) or to write new data onto the disk. The read/write head is part of a head slider that is kept floating a predetermined distance from the disk during the operation of a hard disk drive.

The height at which the head slider floats above the disk depends on the dynamic lift exerted on the head slider by air flowing over the surface of the head slider that faces the disk, and the elasticity of a suspension that supports the head slider. The dynamic lift is largely affected by the shape of the surface of the head slider that faces the disk, and by the physical properties of the airflow created between the head slider and the disk. Environmental conditions within the hard disk drive affect the physical properties of the airflow and hence, affect the dynamic lift exerted on the head slider. These environmental conditions include temperature, humidity, and air density (altitude).

The height at which the head slide floats above the disk when optimized minimizes data read/write errors and the possibility of head-disk interference (HDI). However, changes in the environmental conditions in which a hard disk drive is disposed (i.e., changes in temperature, humidity, and air density) may cause the head slider to float at less than an optimal distance from the surface of the disk. Accordingly, changes in environmental conditions can cause the hard disk drive to improperly read/write date from/onto the disk, and can also cause the magnetic head and disk to collide (HDI) with such force that the head and/or the disk becomes damaged.

SUMMARY OF THE INVENTION

One object of the present invention is to provide a hard disk drive that can read and write data from and onto a disk with a high degree of reliability.

Another object of the present invention is to provide a hard disk drive that minimizes the likelihood of HDI.

Still another object of the present invention is to provide a head slider whose height relative to a disk can be optimized while in use.

Similarly, another object of the present invention is to provide a hard disk drive which can keep its head slider floating at an optimum distance from a disk.

Yet another object of the present invention is to provide a method of controlling the height at which a head slider of a hard disk drive floats above a disk during a read/write operation.

According to one aspect of the present invention, there is provided a head slider including a head slider body, a magnetic read/write head embedded in the head slider body, and at least one resistive heating element integrated with the head slider body. Current supplied to the at least one resistive heating element generates heat that changes the profile of the disk-facing side of the head slider body by causing the head slider body to undergo thermal expansion. Preferably, each resistive heating element is formed of an Fe—Cr (iron-chrome) alloy or an Ni—Cr (nickel-chrome) alloy.

The head slider body may have an ABS (air bearing surface) at the disk-facing side thereof, and may define a cavity in the disk-facing side. The ABS constitutes the end face of a protrusion upon which air pressure is exerted to keep the head slider off of a disk of the hard disk drive. In this case, a resistive heating element is juxtaposed with the cavity. The head slider body may also define a recess bordering the ABS. The cavity is deeper than the recess, and another resistive heating element is juxtaposed with the recess.

According to another aspect of the present invention, there is provided a hard disk drive that employs a head slider having the features described above. The hard disk drive includes a data storage disk, a spindle motor to which the data storage disk is mounted, and a head stack assembly. The head stack assembly has a swing arm supported so as to be rotatable in the hard disk drive, and the head slider disposed at leading end of the swing arm.

According to another aspect of the present invention, there is provided a feedback method of controlling the height at which a head slider floats over a disk in a hard disk drive (HDD). An actual distance between the disk and a side of the head slider that faces the disk is determined, i.e., measured, during a read/write operation of the HDD. The distance is compared to a predetermined optimum distance in the form of a value or range of values. The profile of the side of the head slider that faces the disk is altered when the actual distance between the disk and a side of the head slider that faces the disk is different than the optimum distance.

According to another aspect of the present invention, the body of the head slider is heated such that a portion of the body thermally expands and thereby changes the profile of the disk-facing side of the body of the head slider. As a result, the sum of forces acting on the head slider is changed to cause the head slider to rise or fall relative to the disk.

According to another aspect of the present invention, the method of controlling the height at which the head slider floats over the disk is carried out by selectively supplying and shutting off the supply of current to each of at least one resistive heating element integrated with the body of the head slider. The supplying of current is controlled on the basis of the comparison between the actual distance between the disk and the side of the head slider that faces the disk, and the predetermined optimum distance.

BRIEF DESCRIPTION OF THE DRAWINGS

The above and other objects, features and advantages of the present invention will become more apparent from the following detailed description of the preferred embodiments thereof made with reference to the attached drawings in which.

DETAILED DESCRIPTION OF THE PREFERRED EMBODIMENTS

Figure 1:
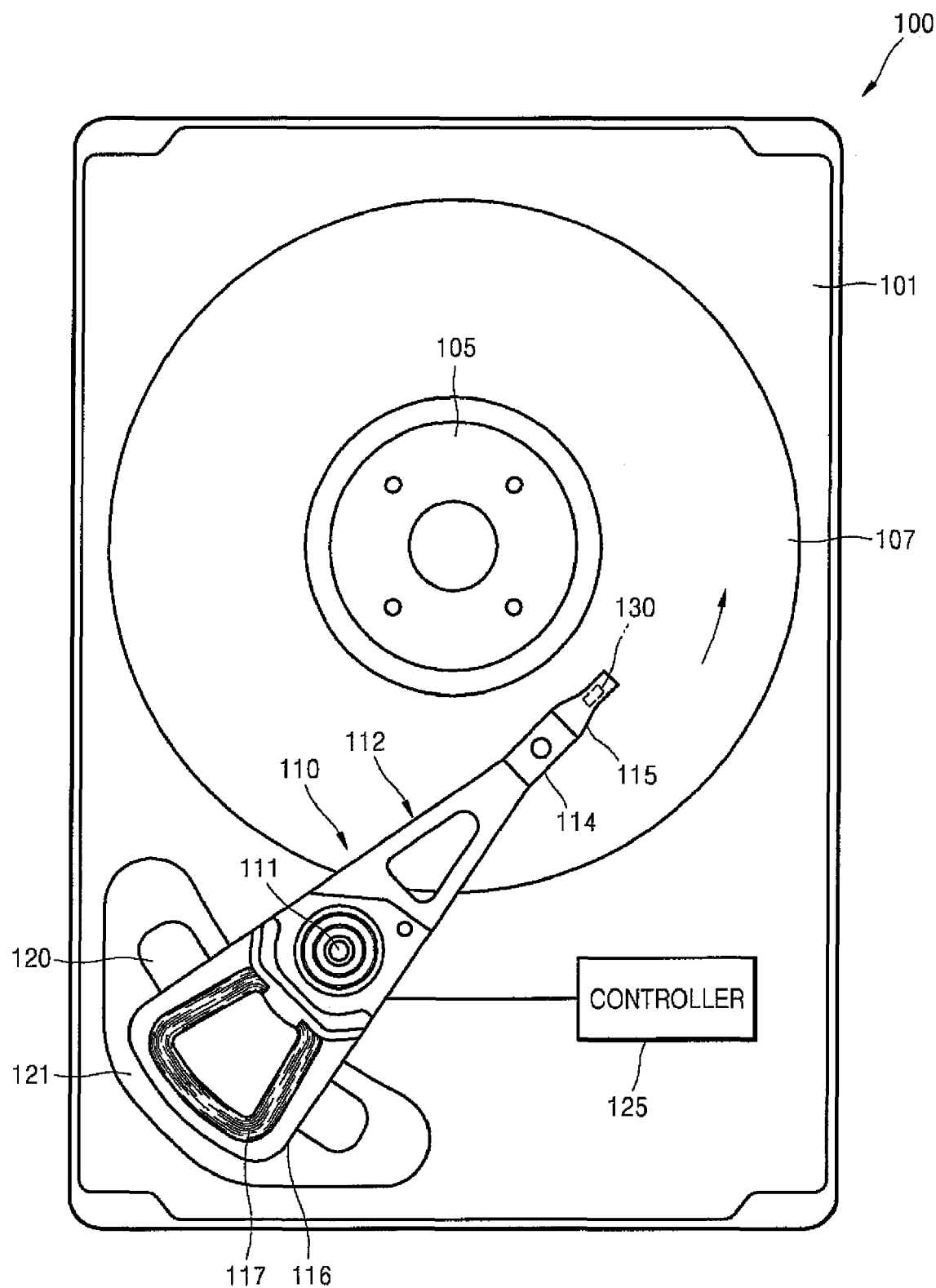
FIG. 1 is a plan view of a hard disk drive according to the present invention.

Referring to FIG. 1, a hard disk drive 100 has a housing formed of a base 101 coupled to a cover (not shown), a spindle motor 105, a disk 107 (i.e., a data recording medium), and a head stack assembly (HSA) 110. The spindle motor 105 is fixed to the base 101 of the housing. The disk 107 is coupled to the spindle motor 105 within the housing and is rotated by the spindle motor 105 at a high speed in the direction of the arrow. This high speed rotation induces air to flow over the surface of the disk 107 in the direction of the arrow.

The HSA 110 is disposed in the housing and includes a swing arm 112, a bearing 111 by which the swing arm is mounted to the base 101 so as to be rotatable about a central axis of the bearing 111 (axis of rotation), a head slider 130 containing a magnetic head for reading or writing data from or onto the disk 107, a suspension 115 that supports the head slider 130, and a coupling plate 114 by which the suspension 115 is coupled to the front end of the swing arm 112.

The HSA 110 also includes a coil support 116 integral with the swing arm 112, and a voice coil 117 wound around the coil support 116. Magnets 120 are disposed above and below the coil support 116, and yokes 121 support the magnets 120, respectively. The magnets 120, yokes 121, and voice coil 117 of the HSA 110 form a voice coil motor that rotates the swing arm 112 of the HSA 110 about the central axis of the bearing 111. The rotation of the swing arm 112 moves the head slider 130 over predetermined tracks on the disk 107 during read/write operations in which the magnetic head reads data recorded on the disk 107 or writes data onto the disk 107 (referred to hereinafter as a read/write operation).

The airflow induced by the high speed rotation of the disk 107 passes between the surface of the disk and the surface of the head slider 130 which faces the disk 107. As a result, the airflow exerts a dynamic lift on the head slider 130. The dynamic lift and the elasticity of the suspension act in opposite directions on the head slider 130 and attain equilibrium to maintain the head slider 130 in position over the surface of the disk, i.e., to float the head slider 130 over the surface of the disk during a read/write operation. Note, the term "over" as used in this context is a relative term as it will be understood by those skilled in the art that the disk 107 may have recording surfaces at both sides thereof and that the HSA 110 may include a respective suspension and head slider associated with the recording surface at the bottom of the disk 107.

The hard disk drive 100 controls the operation of the spindle motor 105 and the HSA 110, and includes a main circuit board (not shown) that controls the operation of the magnetic head. The main circuit board is disposed below the base 101, and is electrically connected to the HSA 110 through a flexible printed circuit (not shown). The main circuit board includes a controller 125 for controlling the position of the head slider 130 during the operation of the hard disk drive 100, as will be described in more detail with respect to FIGS. 4 and 5. First, though, the structure of the head slider 130 will be described in more detail with reference to FIGS. 2 and 3.

The head slider 130 includes a head slider body 131 formed of AlTiC and a magnetic head 132 embedded in the head slider body 131 at one end thereof. The magnetic head 132 is located at the so-called "trailing edge" of the head slider 130, namely adjacent the end of the head slider 130 past which the air flow induced by the rotation of the disk 107 (refer to FIG. 1) streams out from under the head slider 130. The magnetic head 132 includes a writing portion (not shown) operative to generate a magnetic field for writing data on the disk 107, and a reading portion (not shown) operative to read data recorded on the disk 107. The writing and reading portions are enclosed and protected by an alumina ($Al_2O_3$) layer.

Figure 2:
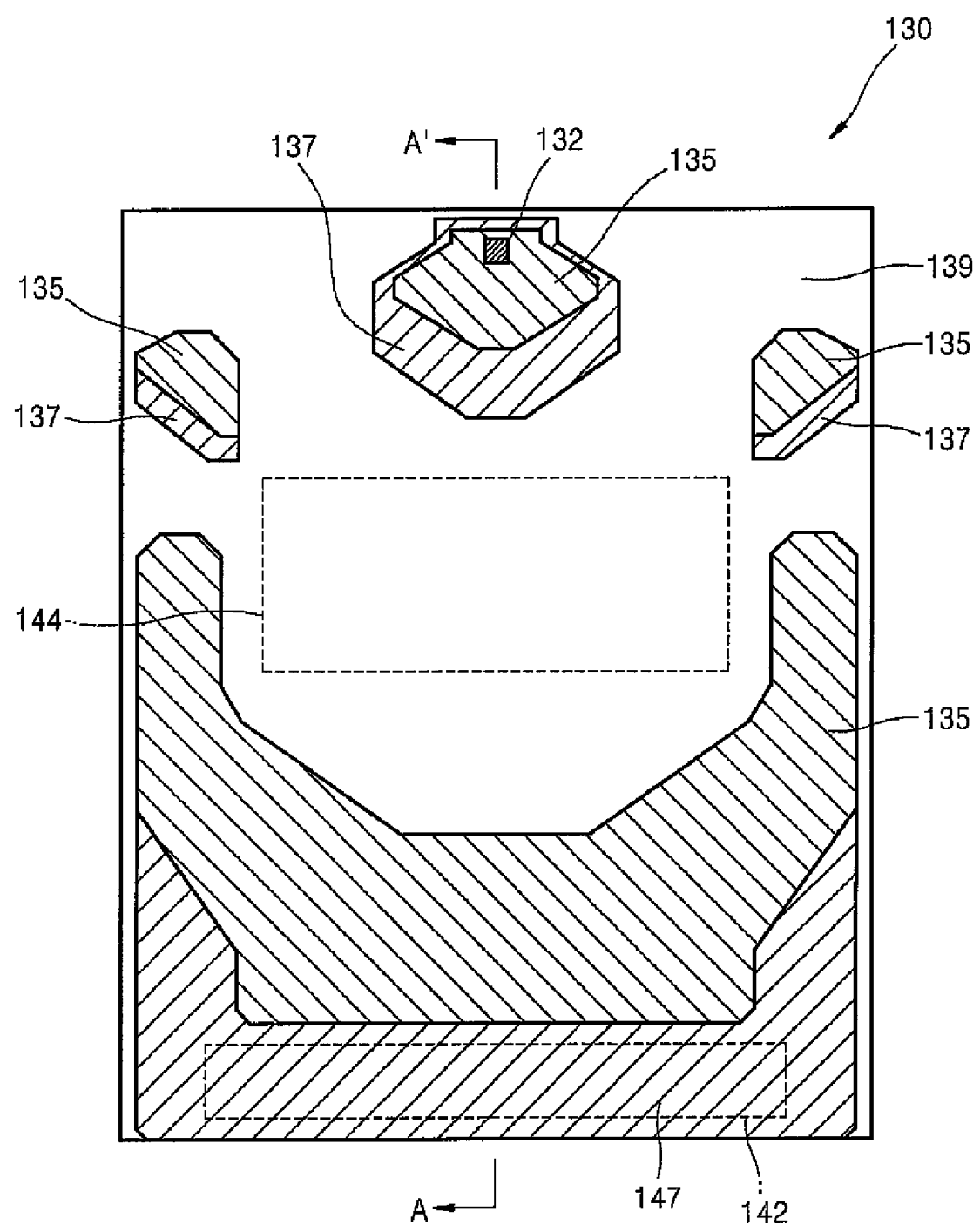
FIG. 2 is a bottom view of a head slider for use in a hard disk drive according to the present invention.
Figure 3:
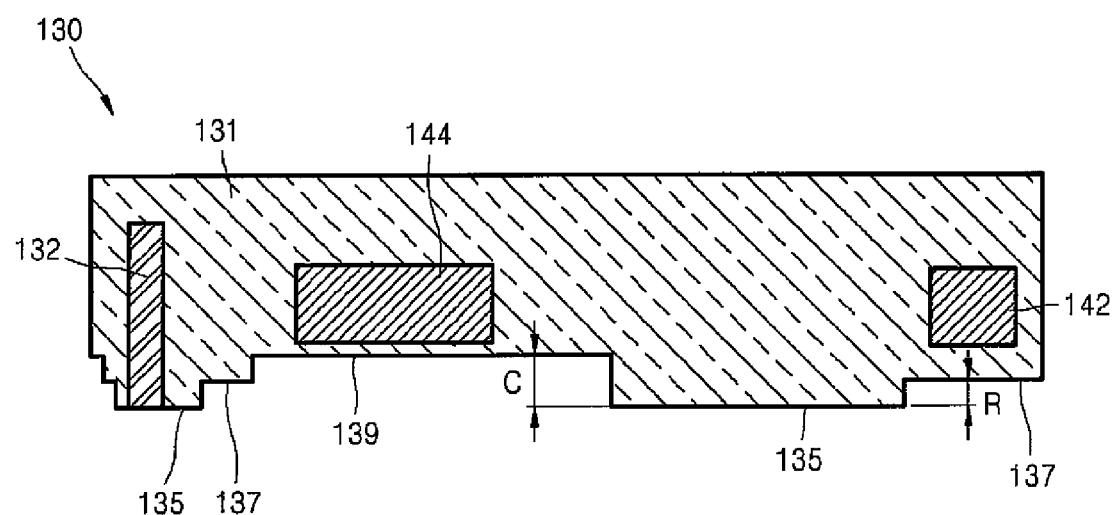
FIG. 3 is a sectional view of the head slider taken along line A-A' of FIG. 2.

The head slider body 131 has an air bearing surface (ABS) 135 at the side thereof that faces the disk 107 (in FIG. 1), and defines a recess 137 bordering the ABS 135, and a cavity 139 that is deeper than the recess 137. The cavity is defined adjacent to and opens at the trailing edge of the head slider 130. Note, although the shapes of the ABS 135, recess 137, and cavity 139 of the head slider body 131 of the preferred embodiment of FIG. 2 are fairly accurately represented in the figure, the present invention is not so limited. Rather, the ABS 135, recess 137, and cavity 139 may have other shapes.

Regardless, the ABS 135 constitutes the end face of a protrusion upon which air pressure is exerted to keep the head slider 130 off of the disk 107. The source of the air pressure is the flow of air between the disk-facing side of the head slider 130 and the surface of the disk 107 confronted by the disk-facing side of the head slider 130. The depth R of the recess 137 is 0.08 to 0.2 μm, i.e., the distance between the ABS 135 and the bottom of the recess is 0.08 to 0.2 μm. The cavity 139 extends over the entire region of the disk-facing side of the head slider body 131 not occupied by the ABS 135 and the recess 137. The depth C of the cavity 139 is approximately 1.0 to 2.5 μm, i.e., the difference between the ABS 135 and the bottom of the cavity 139 is approximately 1.0 to 2.5 μm. Negative pressure is generated in the cavity 139 as the air flow streams out past the trailing edge of the head slider 130. The negative pressure helps the head slider 130 remain in a steady floating state over the disk while the head slider 130 rolls and pitches, etc. during a read/write operation. That is, the negative pressure exerted on the head slider 130 urges the head slider 130 toward the surface of the disk in opposition to the lift exerted on the head slider at the ABS 135.

The head slider 130 also includes a recess heat radiating element 142 and a cavity heat radiating element 144 which are integrated with the head slider body 131 and generate heat when current is supplied thereto. To this end, the recess heat radiating element 142 and the cavity heat radiating element 144 are preferably of a material having a high resistance, such as an iron-chrome (Fe—Cr) alloy or a nickel-chrome (Ni—Cr) alloy. Each of the heat radiating elements 142 and 144 is connected to a source of electrical power and the controller 125 (FIG. 1) is operative to control the supply of current to the heat radiating elements 142 and 144.

In addition, the recess heat radiating element 142 is embedded in the body 131 of the head slider 130 as juxtaposed with the recess 137 adjacent the leading edge of the head slider 130. The cavity heat radiating element 144 is embedded in the body 131 of the head slider 130 as juxtaposed with a region of the recess 137. Therefore, the region of the cavity juxtaposed with the cavity heat radiating element 144 is located closer to the trailing edge of the head slider 130 than the region of the recess 137 juxtaposed with the recess heat radiating element 142.

When current is supplied to the recess heat radiating element 142 or the cavity heat radiating element 144, the body 131 of the head slider is expanded by the heat radiating from the heat radiating element 142 or the cavity heat radiating element 144 such that the profile of the disk-facing side of the head slider 130 changes. Specifically, the portion of the head slider body 131 adjacent the recess 137 is expanded by heat produced by the recess heat radiating element 142. As a result, the surface of the head slider body 131 which delimits the bottom of the recess 137 protrudes toward the disk, as illustrated by the chain lines in FIG. 5. Similarly, the portion of the head slider body 131 adjacent the cavity 139 is expanded by heat produced by the cavity heat radiating element 144. As a result, the surface of the head slider body 131 which delimits the bottom of the cavity 139 protrudes toward the disk, as illustrated by the chain lines in FIG. 4.

A method of controlling the head slider 130 will now be described in more detail with reference to FIGS. 4 and 5.

Figure 4:
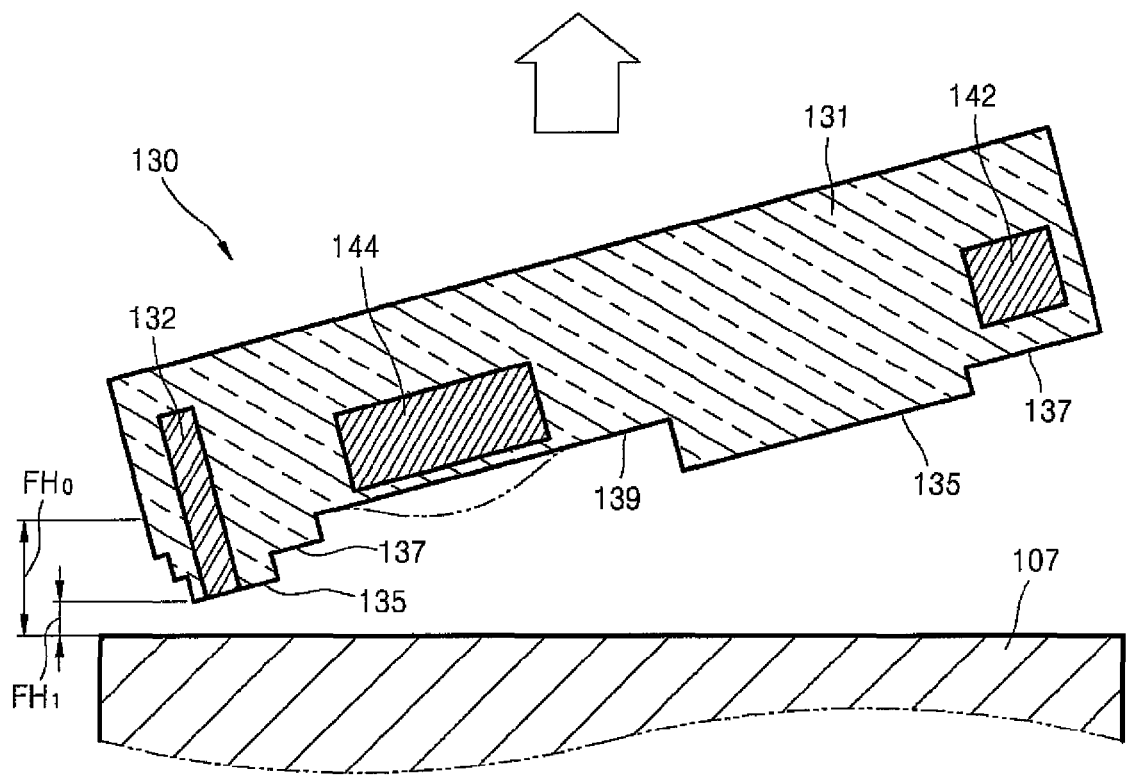
FIGS. 4 and 5 are each a sectional view similar to that of FIG. 3 and illustrate a method of controlling the height of a head slider during a read/write operation according to the present invention.

Referring first to FIG. 4, the distance between the recording surface of the disk 107 and the head slider 130 is measured during a read/write operation of the hard disk drive. That is, the height FH1 at which the head slider 130 floats over the disk 107 is measured. The height FH1 may be measured, for example, by determining the strength of the signals generated by the reading portion of the magnetic head 132 during a read operation. The measured height FH1 is compared by the controller 125 (FIG. 1) with a predetermined optimum distance or height FHo. The optimum height FHo is the height at which read/write errors and HDI are minimized, and may be determined by conducting a burn-in test of the hard disk drive 100. Also, the optimum height FHo may be determined as an allowable range of heights. In any case, if the measured height FH1 is below the predetermined optimum height FHo, the controller 125 (FIG. 1) supplies current to the cavity heat radiating element 144.

As described above, current supplied to the cavity heat radiating element 144 causes the surface of the head slider body 131 that delimits the bottom of the cavity 139 to protrude toward the disk 107, as shown by the chain lines in FIG. 4. Thus, the negative pressure created within the cavity 139 decreases. Accordingly, the height FH1 at which the head slider 130 floats over the disk 107 increases. The current is supplied to the cavity heat radiating element 144 until the measured height FH1 reaches the optimum height FHo. At that time, the controller 125 shuts off the supply of current to the cavity heat radiating element 144.

Figure 5:
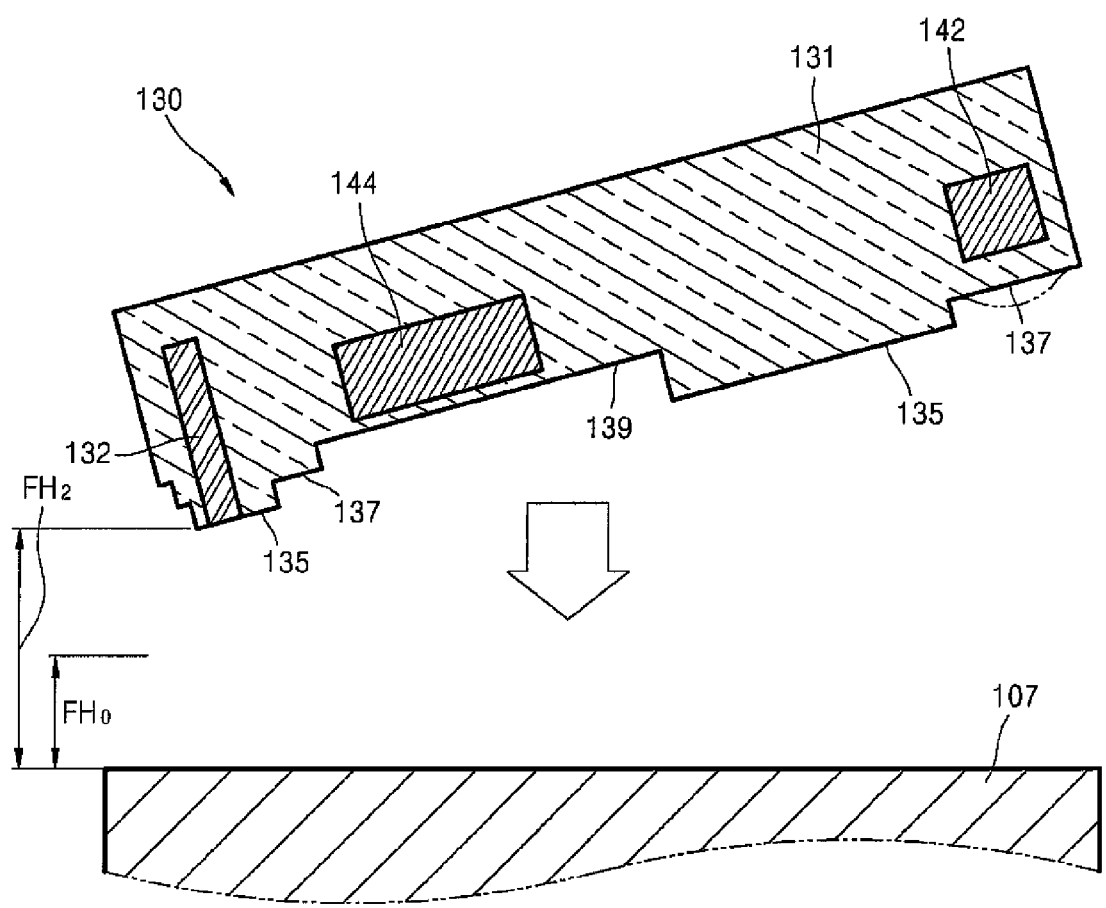

Referring to FIG. 5, the controller 125 causes current to be supplied to the recess heat radiating element 142 when the measured height FH2 of the head slider 130 exceeds the optimum height FHo. In this case, the recess heat radiating element 142 causes the surface of the head slider body 131 which delimits the bottom of the recess 137 to protrude toward the disk, as shown by the chained lines in FIG. 5. Thus, the difference between the depth of the recess 137 at the leading edge of the head slider 130 and the depth of the cavity 139 increases. That is, the relative depth of the cavity 139 increases. Accordingly, the negative pressure generated within the cavity 139 increases and the height at which the head slider 130 floats over the disk 107 correspondingly decreases. The current is supplied to the recess heat radiating element 142 until the measured height FH2 reaches the optimum flying height FHo. At that time, the controller 125 shuts off the supply of current to the recess heat radiating element 142.

According to the present invention as described above, the head slider can be maintained at an optimum distance from the disk under a large range of environmental conditions or even when environmental conditions within the disk drive change. Accordingly, a hard disk drive according to the present invention performs read/write operations with a high degree of reliability, and prevents HDI and hence, damage to the magnetic head or disk due, from occurring.

Finally, although the present invention has been described in connection with the preferred embodiments thereof, it is to be understood that the scope of the present invention is not so limited. On the contrary, various modifications of and changes to the preferred embodiments will be apparent to those of ordinary skill in the art. Thus, changes to and modifications of the preferred embodiments may fall within the true spirit and scope of the invention as defined by the appended claims.

What is claimed is:

1. A head slider for use in a hard disk drive (HDD) including a disk, the head slider comprising:
    a head slider body having a disk-facing side that faces the disk;
    a magnetic read/write head embedded in the head slider body proximate to the disk-facing side; and
    a first heat radiating element integrated in the head slider body and a second heat radiating element separate from the first heat radiating element and integrated in the head slider body, wherein electrical current independently applied to either one of the first and second heat radiating elements thermally expands the head slider body to change the profile of the disk-facing side of the head slider body.

2. The head slider of claim 1, wherein at least one of the first and second heat radiating elements comprises an Fe—Cr (iron-chrome) alloy or an Ni—Cr (nickel-chrome) alloy.

3. The head slider of claim 1, wherein
    the head slider body includes a leading edge and a trailing edge, and comprises an ABS (air bearing surface) including an end face on which air pressure is exerted to lift the head slider off the disk, and a cavity formed to a first depth in the disk-facing side between the ABS and the leading edge of the disk-facing side, and
    the first heat radiating element is embedded in the head slider body proximate the cavity.

4. The head slider of claim 3, wherein the head slider body further comprises a recess formed to a second depth, less than the first depth, in the disk-facing surface.

5. The head slider of claim 4, wherein the recess comprises a first portion disposed between the cavity and the ABS proximate the leading edge of the head slider body, and a second portion proximate the leading edge of the head slider body.

6. The head slider of claim 5, wherein the second heat radiating element is embedded in the head slider body proximate the second portion of the recess.

7. The head slider of claim 1, wherein the head slider body includes a leading edge and a trailing edge, the first heat radiating element is embedded in the head slider body proximate the trailing edge, and the second heat radiating element is embedded in the head slider body proximate the leading edge.

8. A head slider for use in a hard disk drive (HDD) including a disk, the head slider comprising:
    a head slider body having a disk-facing side that faces the disk and includes a leading edge and a trailing edge;
    a magnetic read/write head integrated in the head slider body near the trailing edge of the disk-facing side; and
    a heat radiating element that thermally expands the head slider body to change the profile of the disk-facing side when electrical current is applied,
    wherein the head slider body comprises an ABS (air bearing surface) including an end face on which air pressure is exerted to lift the head slider off the disk, and a cavity formed to a first depth in the disk-facing side between the ABS and the leading edge of the disk-facing side, and
    the heat radiating element is embedded in the head slider body proximate the cavity.

9. The head slider of claim 8, wherein the heat radiating element comprises an Fe—Cr (iron-chrome) alloy or an Ni—Cr (nickel-chrome) alloy.

10. The head slider of claim 8, further comprising:
another heat radiating element embedded in the head slider body separate from the heat radiating element proximate the cavity.

11. The head slider of claim 10, wherein the another heat radiating element is embedded in the head slider proximate the leading edge of the head slider body.

12. The head slider of claim 10, further comprising:
a recess formed to a second depth less than the first depth and including a first portion disposed between the cavity and the ABS proximate the trailing edge of the head slider body, and a second portion proximate the leading edge of the head slider body.

13. The head slider of claim 12, wherein the second heat radiating element is embedded in the head slider body proximate the second portion of the recess.

14. The HDD of claim 12, wherein the second heat radiating element is embedded in the head slider body proximate the second portion of the recess.

15. A hard disk drive (HDD), comprising:
a data storage disk;
a spindle motor that mechanically mounts and rotates the data storage disk;
a head stack assembly (HAS) including a swing arm supported so as to be rotatable in the HDD, and a head slider disposed at a leading end of the swing arm, the swing arm positioning the head slider over the data storage disk during a read/write operation,
wherein the head slider comprises:
a head slider body having a disk-facing side that faces the disk and includes a leading edge and a trailing edge;
a magnetic read/write head integrated in the head slider body near the trailing edge of the disk-facing side; and
a heat radiating element that thermally expands the head slider body to change the profile of the disk-facing side when electrical current is applied,
wherein the head slider body comprises an ABS (air bearing surface) including an end face on which air pressure is exerted to lift the head slider off the disk, and a cavity formed to a first depth in the disk-facing side between the ABS and the leading edge of the disk-facing side, and
the heat radiating element is embedded in the head slider body proximate the cavity.

16. The HDD of claim 15, wherein the head slider further comprises:
another heat radiating element embedded in the head slider body separate from the heat radiating element proximate the cavity.

17. The HDD of claim 16, wherein the another heat radiating element is embedded in the head slider proximate the leading edge of the head slider body.

18. The HDD of claim 16, wherein the head slider further comprises:
a recess formed to a second depth less than the first depth and including a first portion disposed between the cavity and the ABS proximate the trailing edge of the head slider body, and a second portion proximate the leading edge of the head slider body.

* * * * *